United States Patent [19]
Auerbach et al.

[11] Patent Number: 4,666,995
[45] Date of Patent: May 19, 1987

[54] OXYMETHYLENE POLYMER MOLDING COMPOSITIONS HAVING ENHANCED RESISTANCE TO BLACK SPECK FORMATION

[75] Inventors: Andrew Auerbach, Livingston; Kavilipalayam Natarajan, Irvington, both of N.J.

[73] Assignee: Celanese Corporation, New York, N.Y.

[21] Appl. No.: 866,984

[22] Filed: May 15, 1986

Related U.S. Application Data

[63] Continuation of Ser. No. 664,796, Oct. 25, 1984, abandoned.

[51] Int. Cl.⁴ .................. C08G 60/00; C08L 71/00
[52] U.S. Cl. ............................. 525/400; 525/411; 525/430; 525/927
[58] Field of Search ................ 525/400, 411, 430, 927

[56] References Cited

U.S. PATENT DOCUMENTS

| | | |
|---|---|---|
| 3,306,953 | 2/1967 | Fourcade et al. ............ 525/400 |
| 3,960,984 | 6/1976 | Kohan ........................ 525/400 |
| 4,098,843 | 7/1978 | Johnson ...................... 525/400 |
| 4,351,916 | 9/1982 | Kohan ........................ 525/400 |

Primary Examiner—Lewis T. Jacobs
Assistant Examiner—A. L. Carrillo
Attorney, Agent, or Firm—Herbert Price

[57] ABSTRACT

The black speck formation which occurs during the compounding and molding of admixtures of oxymethylene polymers and polyamides having a melting or softening point below that of the oxymethylene polymer can be reduced by adding the polyamide to the oxymethylene polymer as a dispersion of the polyamide in a carrier resin which is inert to the oxymethylene polymer and has a melting or softening point below that of the oxymethylene polymer. The polyamide comprises less than about 50 weight percent of the dispersion.

8 Claims, No Drawings

OXYMETHYLENE POLYMER MOLDING COMPOSITIONS HAVING ENHANCED RESISTANCE TO BLACK SPECK FORMATION

This is a continuation of co-pending application Ser. No. 664,796 filed on Oct. 25, 1984, now abandoned.

BACKGROUND OF THE INVENTION

The present invention relates to improving or reducing the black speck formation which frequently occurs during compounding and molding oxymethylene polymer molding compositions stabilized with polyamides having a melting or softening point below that of the oxymethylene polymer. More particularly, the present invention relates to oxymethylene polymer molding compositions containing a lower melting or softening polyamide stabilizer dispersed in a lower melting or softening carrier resin which composition may be molded into articles containing a reduced number of black specks.

Oxymethylene polymers, having recurring —CH$_2$O— units have been known for many years. These polymers are used for a wide variety of molded articles. In the preparation of the molding compositions, minor amounts or portions of lower melting polyamides are frequently admixed with the oxymethylene polymer to improve the polymer stability during compounding and molding operations.

While the addition of the lower melting polyamides to oxymethylene polymers has provided excellent melt stability, black specks are commonly formed during both the compounding and the molding operations. As a result, the final molded article often contains black specks, thereby adversely affecting the appearance of the molded article. It is believed that the black specks are formed during both the compounding and the molding operations due to the reaction between free formaldehyde present in the oxymethylene polymer and the lower melting polyamide. The formaldehyde and polyamide are believed to react to form a gel-like substance which a dheres to the extrusion screws used in the compounding and the molding equipment. The gel becomes black with the passage of time at the compounding and molding temperatures; portions eventually break apart from the screws as black specks and end up in the compounded molding composition and eventually in the final molded object or article.

Accordingly, it is an object of the present invention to provide an oxymethylene polymer molding composition containing a lower melting or softening polyamide which has a reduced tendency to form black specks during compounding and molding operations.

These and other objects, as well as the scope, nature and utilization of the present invention, will be apparent to those skilled in the art from the following description and appended claims.

SUMMARY OF THE INVENTION

In accordance with the present invention, an improved polyamide stabilized oxymethylene polymer molding composition is provided by intimately blending or admixing (a) a major portion of oxymethylene polymer, and (b) a minor portion of a dispersion of polyamide in a carrier resin, the polyamide comprising less than about 50 weight percent of the dispersion and having a melting or softening point below the melting point of the oxymethylene polymer, and the carrier resin being inert to the oxymethylene polymer and having a melting or softening point below or equal to the melting point of the oxymethylene polymer.

There is further provided, in accordance with the instant invention, a process for reducing or minimizing the black speck formation which occurs during compounding, i.e., admixing, oxymethylene polymers with lower melting or softening polyamides, and during the subsequent molding of the compounded mixture. The process comprises the addition of the lower melting or softening polyamide to the oxymethylene polymer as a dispersion of the polyamide in a carrier resin which is inert to the oxymethylene polymer and has a melting or softening point equal to or lower than the oxymethylene polymer.

The polyamide-carrier resin dispersion is believed to minimize black speck formation by providing a smaller size polyamide to react with the free formaldehyde present in the oxymethylene polymer. The resulting gels are so small that they work their way through the compounding and molding equipment mixing screws without adhering thereto and thereby forming black specks. Surprisingly, when the lower melting polyamide is simply ground to a smaller size particle and added to the oxymethylene polymer directly, the black speck formation is not similarly improved.

It is further believed that the carrier resin acts as a time release to help keep the polyamide from preferentially settling out on the compounding screw before being properly blended or admixed with the oxymethylene polymer.

In some instances it has also been found that the use of the polyamide-carrier resin dispersion improves the stabilizer efficiency of the polyamide.

DESCRIPTION OF PREFERRED EMBODIMENTS

Oxymethylene Polymer

The oxymethylene polymer used in the molding composition of the present invention is well known in the art. The polymers are characterized as having recurring oxymethylene groups or units, i.e., —CH$_2$O—. The term oxymethylene polymer as used herein is intended to include any oxymethylene polymer having —CH$_2$O— groups comprising at least about 50 percent of the recurring units, for example, homopolymer, copolymers, terpolymers and the like.

Typically, the homopolymers are prepared by the polymerization of anhydrous formaldehyde or by the polymerization of trioxane which is a cyclic trimer of formaldehyde. For example, high molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordinate complexes with organic compounds, as described in application Serial No. 691,143, filed Oct. 21, 1957 now U.S. Pat. No. 2,989,506, by Hudgin and Berardinelli.

Oxymethylene polymers that are particularly adapted for use in the molding compositions of the present invention are oxymethylene copolymers, which may be prepared as described in U.S. Pat. No. 3,027,352 of Walling et el by copolymerizing, for example, trioxane with any of various cyclic ethers having at least two adjacent carbon atoms, e.g., ethylene oxide, dioxolane, and the like.

Especially suitable oxymethylene copolymers which may be used in the molding compositions of the present invention usually possess a relatively high level of polymer crystallinity, i.e., about 70 to 80 percent. These preferred oxymethylene copolymers have repeating units which consist essentially of (a) —OCH$_2$— groups interspersed with (b) groups represented by the general formula:

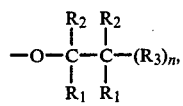

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals, and n is an integer from zero to three inclusive.

Each lower alkyl radical preferably has from one to two carbon atoms, inclusive. The —OCH$_2$— units of (a) constitute from about 85 to about 99.9 percent of the recurring units. The units of (b) may be incorporated into the copolymer during the step of copolymerization to produce the copolymer by the opening of the ring of a cyclic ether having adjacent carbon atoms, i.e., by the breaking of an oxygen-to-carbon linkage.

Copolymers of the desired structure may be prepared by polymerizing trioxane together with from about 0.1 to about 15 mole percent of cyclic ether having at least two adjacent carbon atoms, preferably in the presence of a catalyst such as a Lewis acid (e.g., BF$_3$, PF$_5$, and the like) or other acids (e.g., HC1O$_4$, 1% H$_2$SO$_4$, and the like).

In general, the cyclic ethers employed in making the preferred oxymethylene copolymers are those represented by the general formula:

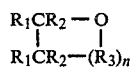

wherein each $R_1$ and $R_2$ is selected from the group consisting of hydrogen, lower alkyl and halogen-substituted lower alkyl radicals, and each $R_3$ is selected from the group consisting of methylene, oxymethylene, lower alkyl and haloalkyl-substituted methylene, and lower alkyl and haloalkyl-substituted oxymethylene radicals, and n is an integer from zero to three inclusive. Each lower alkyl radical preferably has from one to two carbon atoms, inclusive.

The preferred cyclic ethers used in the preparation of the preferred oxymethylene copolymers are ethylene oxide and 1,3-dioxolane, which may be represented by the formula:

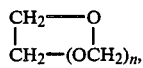

wherein n represents an integer from zero to two, inclusive. Other cyclic ethers that may be employed are 1,3-dioxane, trimethylene oxide, 1,2-propylene oxide, 1,2-butylene oxide, 1,3-butylene oxide and 2,2-di-(chloromethyl)-1,3-propylene oxide.

The preferred catalyst used in preparing the desired oxymethylene copolymers is the aforementioned boron trifluoride as discussed in the previously identified Walling et al patent. Reference is made to this patent for further information concerning the polymerization conditions, amount of catalyst employed, and the like.

The oxymethylene copolymers produced from the preferred cyclic ethers have a structure composed substantially of oxymethylene and oxyethylene groups in a ratio of from about 6 to 1 to about 1000 to 1.

The oxymethylene copolymers that are preferably present in the molding compositions of the present invention are thermoplastic materials having a melting point of at least 150° C., and normally are millable or processable at a temperature of from about 180° C. to about 220° C. They have a number average molecular weight of at least 10,000. The preferred oxymethylene copolymers have an inherent viscosity of at least 1.0 (measured at 60° C. in a 0.1 weight percent solution in p-chlorophenol containing 2 weight percent of alphapinene).

The oxymethylene copolymer component of the molding composition of this invention preferably is an oxymethylene copolymer that has been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by hydrolysis as disclosed in U.S. Pat. No. 3,219,623 to Berardinelli.

If desired, the oxymethylene polymers may be end-capped by techniques known to those skilled in the art. A preferred end-capping technique is accomplished by acetylation with acetic anhydride in the presence of sodium acetate catalyst. A preferred oxymethylene copolymer is commercially available from Celanese Corporation under the designation CELCON ® acetal copolymer, and especially preferred is CELCON ® M90 which has a melt index of about 9.0 g./10 min. when tested in accordance with ASTM D1238-82.

With respect to the oxymethylene terpolymer, it may be prepared, for example, by reacting trioxane and a cyclic ether and/or cyclic acetal such as in the preparation of the oxymethylene copolymer, with a third monomer which is a bifunctional compound such as a diglycide of the formula:

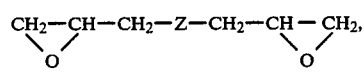

wherein Z represents a carbon-to-carbon bond, an oxygen atom, an oxy-alkoxy of 1 to 8 carbon atoms, preferably 2 to 4 carbon atoms, and which may be an oxycycloalkoxy of 4 to 8 carbon atoms, or an oxy-poly(lower alkoxy), preferably of 2 to 4 recurring groups each with 1 to 2 carbon atoms, for example, ethylene diglycide, diglycidyl ether and diethers of 2 mols of glycide and 1 mol of formaldehyde, dioxane or trioxane, or diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol, 1,4-butanediol, 1,3-butanediol, cyclobutane-1,3-diol, 1,2-propane-diol, cyclo-hexane-1,4-diol and 2-dimethyl-4-dimethyl-cyclobutane-1,3-diol, with butanediol diglycidyl ethers being most preferred.

Generally, in preparing the terpolymer of trioxane, cyclic ether and/or cyclic acetal and at least one bifunctional diglycide compound, a ratio of from 99.89 to 89.0 weight percent trioxane, 0.1 to 10 weight percent of the cyclic ether and/or cyclic acetal, and 0.01 to 1 weight percent of the bifunctional compound is preferred, with the percentage figures being based on the total weight of monomers used in forming the terpolymer. The terpolymers thus obtained are characterized as being essentially white and having a particularly good extrudability.

The polymerization of the terpolymer may be carried out according to known methods, that is in substance, solution or suspension, while using the above-mentioned quantitative proportions of the termonomers. As solvents, there may advantageously be used inert aliphatic or aromatic hydrocarbons, halogenated hydrocarbons or ethers.

In some cases, it may be advantageous to use the following quantitative proportions: 99.85 to 89.5 weight percent of trioxane, 0.1 to 10 weight percent of cyclic ether or cyclic acetal, and 0.05 to 0.5 weight percent of diglycidyl ether, the percentage figures being calculated on the total weight of the monomer mixture used for preparing the terpolymer. The trioxane-based terpolymer polymerization is advantageously carried out at temperatures at which trioxane does not crystallize out, that is, at a temperature within the range of $-50°$ C. to $+100°$ C., depending on the solvent used, and in the absence of a solvent at a temperature within the range of $+20°$ C. to $+100°$ C.

As trioxane-based terpolymer polymerization catalysts, all substances may be used which are capable of initiating a cationic polymerization, for example, organic or inorganic acids, acid halides and, preferably, Lewis acids. Of the latter, boron fluoride and its complex compounds, for example, etherates of boron fluoride, are advantageously used. Diazonium fluoroborates are particularly advantageous.

The concentration of the catalyst may vary within the limits depending on the nature of the catalyst and on the intended molecular weight of the terpolymer. The concentration of the catalyst may be within the range of 0.0001 to 1 weight percent, calculated on the total monomer mixture, and is advantageously within the range of 0.001 to 0.1 weight percent.

Since the catalysts tend to decompose the terpolymer, the catalyst is advantageously neutralized immediately after the polymerization, for example, with ammonia or methanolic or acetonic amine solutions.

The unstable terminal hemiacetal groups may be removed from the terpolmyer in the same manner as known for other oxymethylene polymers. Advantageously, the terpolymer is suspended in aqueous ammonia at temperatures within the range of 100° C. to 200° C., and if desired, in the presence of a swelling agent such as methanol or n-propanol. Alternatively, the terpolymer is dissolved in an alkaline medium at temperatures above 100° C. and subsequently reprecipitated. Examples of suitable solvents are benzyl alcohol, ethylene glycol monoethyl ether or a mixture of 60 weight percent methanol and 40 weight percent water. Examples of suitable compounds having an alkaline reaction are ammonia and aliphatic amines.

Alternatively, the terpolymer can be subjected to heterogeneous hydrolysis wherein water, with or without a catalyst, e.g., an aliphatic or aromatic amine, is added to a melt of the terpolymer in an amount ranging from about 1 to about 50 percent based on the weight of the terpolymer. The terpolymer mixture is maintained at a temperature in the range of from about 170° C. to 250° C. for a specified period of time, and then washed with water and dried or centrifuged.

A preferred oxymethylene terpolymer is commercially available from Celanese Corporation under the designation U10, and is a butanediol diglycidyl ether-/ethylene oxide/trioxane terpolymer containing about 0.05 weight percent, 2.0 weight percent, and 97.95 weight percent of each component, respectively.

Polyamide Stabilizer

The polyamide stabilizer used in the instant invention can be any polyamide having a melting or softening point below the melting point of the oxymethylene polymer into which it is incorporated or with which it is to be admixed. The polyamide may be crystalline, partially crystalline or amorphous. In the case of an amorphous polyamide, its softening point or temperature should be below the melting point or temperature of the oxymethylene polymer. In short, so long as an amorphous polyamide is processable in the compounding and molding equipment at a temperature below the melting temperature of the oxymethylene polymer it can be used. In all such instances the softening point of the polyamide will be below the melting point of the oxymethylene polymer. Generally, the melting temperature or softening temperature of the polyamide should be about 3° C. to about 10° C. or more below the melting temperature of the oxymethylene polymer. The melting temperature is measured by differential scanning calorimetry.

The polyamide must also be one which is stable and does not decompose during the oxymethylene polymer compounding and molding operations, as well as during the formation of the polyamide-carrier resin dispersion.

The polyamides, within the above limitations, can vary widely in composition and molecular weight. They are selected from the many macromolecular polyamides known in the art in which carboxamide linkages.

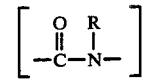

form an integral part of the polymer chain and which upon hydrolysis yield monomeric compounds selected from (1) mixtures of dicarboxylic acids and diamines and (2) omega - aminomonocarboxylic acids. These polyamides preferably have carboxamide linkages in which R is hydrogen, alkyl or alkoxy. The molecular weight of the polyamides can vary widely, with degrees of polymerization ranging about from 50 to 500.

The preferred polyamides have a melting temperature or softening temperature of from about 105° C. to about 160° C. A particularly preferred polyamide is a terpolymer of nylon 6,6/6,10/6, which has a melting point of about 150° C. to about 157° C., and is commercially available from E. I. Du Pont de Nemours and Company under the designation Elvamide 8063.

The amount of polyamide used will vary depending upon the particular oxymethylene polymer used and the degree of stability desired. Generally, the amount of polyamide used is from about 0.01 to about 10.0 weight percent, based on the weight of the oxymethylene polymer, preferably from about 0.01 to about 1.0 weight percent, and most preferably from about 0.1 to about 0.5 weight percent, for example, about 0.25 weight percent.

Carrier Resin

The particular polymeric carrier resin into which the stabilizing polyamide is dispersed should be selected to melt or soften at or below the melting point or temperature of the oxymethylene polymer and be inert to the oxymethylene polymer, that is, the carrier resin should be one which does not adversely affect the properties of the oxymethylene polymer with which it is to be admixed. Generally, the preferred carrier resins also have a melting or softening temperature below the melting or softening temperature of the polyamide used.

With respect to the carrier resin, softening point or temperature means that the material can be processable at a temperature equal to or below the melting temperature of the oxymethylene polymer, and preferably below the melting or softening temperature of the polyamide. In addition, for satisfactory preparation of the polyamide dispersion and its subsequent use in the oxymethylene polymer, the carrier resin should have a decomposition temperature higher than the temperatures used during the oxymethylene polymer compounding and molding operations and higher than the temperatures used during the formation of the polyamide-carrier resin dispersion.

Within these guidelines, a wide variety of specific carrier resins can be used, as will be evident to those skilled in the art. These include, for example, polyethylene and copolymers of ethylene with methyl acrylate, ethyl acrylate, vinyl acetate, acrylonitrile, carbon monoxide, or methyl methacrylate, and especially ethylene-ethyl acrylate copolymers containing from about 10 to 30 weight percent ethyl acrylate and having a melt index of from about 0.5 to 100, and preferably from about 1 to 20. Still other materials which can be used as the carrier resin include methacrylate and acrylate copolymers, such as polymethyl methacrylate containing about from 4 to 15 percent ethyl acrylate, copolyesters, polyether-esters, polystyrene, styreneacrylonitrile copolymers, polyethylene oxide, polyether homo and copolymers and mixtures of two or more of the above polymers.

Particularly preferred carrier resins are copolymers of ethylene with ethyl acrylate or vinyl acetate such as those commercially available from Union Carbide under the designation BAKELITE® Ethylene Copolymer DPD-6169 Natural; DPDA-6182 Natural; and DQDA-6479 Natural 7. The most preferred carrier resin is DPDA-6182 Natural, which has a melting point or temperature of about 110° C. to about 120° C.

The above carrier resins are linear in nature. Cross linked carrier resins are not suitable as illustrated hereinafter.

Dispersion Formation

In the preparation of the instant dispersions, the polyamide and the carrier resin are first blended at a temperature above the melting temperatures or softening temperatures, if applicable, of both the polyamide and the carrier resin. These components are generally blended in a high shear mixing device of the type known in the art, to disperse the polyamide in the carrier resin as fine particles.

The polyamide-carrier resin dispersion should contain less than about 50 weight percent polyamide, preferably from about 20 to about 40 weight percent, and most preferably about 33 weight percent.

Any convenient apparatus can be used for admixing the carrier resin and the polyamide stabilizer, typically at a temperature within the range of about 160° C. to about 250° C. In one preferred blending procedure, polyamide and carrier resin granules are first dry blended and then melt extruded in a high shear single or twin screw extruder, followed by cutting the extruded strands into pellets. The pelletizer strand bath water should be kept below about 25° C. to about 30° C. in order to adequately cut the strands. Above about 30° C. the pellets tend to tear creating long, stringy clumps of polyamide-carrier resin dispersion product.

The polyamide-carrier resin dispersion is also preferably prepared in an inert atmosphere such as a nitrogen blanket or purge in order to reduce air oxidation of the polyamide. Polyamide oxidation may result in unwanted discoloration of the polyamide-carrier resin dispersion, which in turn might adversely affect the color of the article molded from the oxymethylene composition with which it is admixed.

Compounding

The polyamide-carrier resin dispersion is admixed with oxymethylene polymer at a temperature above the melting temperature or softening temperature, if applicable, of the oxymethylene polymer, the carrier resin and the polyamide, to obtain a substantially uniform mixture or intimate blend of the oxymethylene polymer and the polyamide-carrier resin dispersion.

In general, the polyamide-carrier resin dispersion is used in an amount of from about 0.03 to about 30 weight percent, and preferably from about 0.03 to about 3 weight percent, based on the weight of the oxymethylene polymer.

The molding compositions may suitably be prepared by any conventional compounding or mixing procedure that will result in an intimate blend or mixture of the components. Preferably, dry or melt blending procedures and equipment are used. For example, the polyamide-carrier resin dispersion can be dry mixed with the oxymethylene polymer (in the form of pellets, chips, granules or powder) typically at room temperature, and the resulting mixture melt blended in any conventional type extrusion equipment, which is heated to a temperature of from about 180° C. to about 230° C., and preferably from about 185° C. to about 205° C. If desired, an inert atmosphere such as a nitrogen blanket or purge may be used during the compounding operation.

The oxymethylene polymer molding composition resulting from the compounding procedure is then comminuted mechanically, for example, by chopping, pelletizing or grinding, into granules, pellets, chips, flakes or powders.

It is within the ambit of the present invention that the oxymethylene polymer molding composition also include, if desired, plasticizers, other formaldehyde scavengers, mold lubricants, antioxidants, fillers, colorants, reinforcing agents, light stabilizers, pigments, other stabilizers, and the like, so long as such additives do not materially affect the desired properties of the resulting molding composition and the articles molded there-from. The additional additives can be admixed at any convenient stage in the molding composition preparation, but usually are added when the oxymethylene polymer is being blended or admixed with the polyamide-carrier resin dispersion.

Other suitable formaldehyde scavengers which may be used include cyanoguanidine, melamines, amine-substituted triazines, other amidines, ureas, hydroxyl salts of calcium, magnesium, and the like, salts of carboxylic acids, and metal oxides and hydroxides.

Suitable mold lubricants include alkylene bisstearamide, long-chain amides, waxes, oils, and polyether glycides. The preferred mold lubricant is commercially available from Glyco Chemical, Inc. under the designation Acrawax C and is alkylene bisstearamide.

The preferred antioxidants are hindered bisphenols. Especially preferred is 1,6-hexamethylene bis-(3,5-di-t-butyl-4hydroxyhydrocinnamate), commercially available from Ciba-Geigy Corp. under the designation Irganox 259.

Oxymethylene terpolymer commercially available from Celanese Corporation under the designation U10-11 may also be added to the molding composition as a nucleant. U10-11 is the previously mentioned U-10 terpolymer stabilized by 0.5 percent by weight Irganox 259 and 0.1 percent by weight calcium ricinoleate.

A compatibilizing agent can also be incorporated into the dispersion of polyamide and carrier resin, or added with the dispersion when it is compounded with the oxymethylene polymer. The compatibilizing agent, when used, generally comprises from about 0.5 to about 30 weight percent of the polyamide-carrier resin dispersion. When an ethylene polymer or copolymer is used as the carrier resin, a variety of compatibilizing agents can be used, including an ethylene copolymer of acrylic or methacrylic acid; such ethylene copolymers partially neutralized with alkali or alkaline earth metals such as zinc; graft copolymers of such partially neutralized compounds with low molecular weight polyamide; as well as ethylene-propylene polymers thermally grafted with compounds such as fumaric acid, maleic anhydride, and ethyl hydrogen maleate. When the carrier resin is a methacrylate or acrylate polymer, particularly suitable compatibilizing agents include methacrylate or acrylate copolymers containing acidic or basic functional groups.

The molding compositions of the present invention may be processed in the thermoplastic state, for example, by injection molding or extrusion molding, into shaped articles, for example, bars, rods, plates, sheets, films, ribbons, or tubes and the like. The incorporation of the polyamide-carrier resin dispersion in the oxymethylene polymer molding compositions minimizes the occurrance of black specks in the resulting molding composition as well as in the resulting molded objects. The black specks previously had been found objectionable in some objects molded from oxymethylene polymer molding compositions stabilized with lower melting polyamides.

Some of the following Examples are given as specific illustrations of the claimed invention. It should be understood, however, that the specific details set forth in the examples are merely illustrative and in no wise limitative. All parts and percentages in the Examples and the remainder of the specification are by weight of the total composition unless otherwise specified.

EXAMPLE I

The oxymethylene polymer used in this and the following Examples was a trioxane-ethylene oxide copolymer containing about 98 weight percent of recurring $-OCH_2-$ groups and about 2 weight percent of comonomer units derived from ethylene oxide having the formula $-OCH_2CH_2-$. The oxymethylene copolymer was prepared as previously has been described herein and more specifically in the aforementioned U.S. Pat. No. 3,027,352 to Walling et al, and had been hydrolyzed to stabilize the ends of the polymer chains. The oxymethylene copolymer possessed a crystallinity of approximately 75 percent, an inherent viscosity (I.V.) of approximately 1.3 (measured at 60° C. in a 0.1 weight percent solution in p-chlorophenol containing 2 weight percent of alphapinene), a melting temperature of 165° C., and a melt index of approximately 9.0 g./10 min. when tested in accordance with ASTM method D1238-82.

Dispersions of Elvamide 8063 (a terpolymer of nylon 6,6/6,10/6) in various carrier resins were prepared by mixing the polyamide and carrier resin in a 28 mm ZSK compounding extruder at a temperature of 180° C., a speed of 120 rpm and a torque of 7–8in. lbs. Each dispersion was pelletized using a strand bath water of below about 29° C. Each of the resulting polyamide-carrier resin dispersions (in pellet form) was then intimately blended with an aliquot portion of the aforementioned oxymethylene copolymer in a ¾" Brabender extruder having a nonvented screw (to maximize the interaction between the polyamide and formaldehyde inside the extruder) at a temperature of approximately 190° C. to 225° C. and at a screw speed of 20 rpm (i.e., the longest residence time of polymer inside the extruder). In each instance a further stabilizer package of Irganox 259, Acrawax C and oxymethylene terpolymer U10-11 was added to the extruder so that a final molding composition containing 98.3 percent by weight oxymethylene copolymer, 0.5 percent by weight Irganox 259, 0.2 percent by weight Acrawax C, 0.25 percent by weight U10-11, and 0.75 percent by weight Elvamide-carrier resin dispersion was obtained, weight percents being based on the total weight of the composition.

In all runs 2 weight percent paraformaldehyde was added (based on the total weight of materials to be compounded) to accelerate the formation of black specks.

The compounded materials were pelletized and the pellets collected approximately every 40 minutes up to a total of three hours of running time. The collected pellet samples were then ground in a Beloit Scrap Grinder and compression molded in a Pasadena Hydraulics Press at 200° C. for 5 minutes to obtain a black speck analysis.

In addition, extractable formaldehyde was measured for each compounded composition by the following procedure.

A 100 gram sample of polyoxymethylene resin was added to 100 ml of distilled water and refluxed at boiling for 60 minutes. The sample was neutralized with potassium hydroxide (0.10 N) solution and the final pH noted. Fifty (50) milliliters of sodium sulfite solution (1.0 M) was added to the neutralized solution. This final solution was then titrated with sulfuric acid (0.10 N) to the original pH level noted previously. A value for the formaldehyde level was calculated from the following formula:

$$\% \text{ Formaldehyde} = \frac{T_b \times N(H_2SO_4) \times 3.0}{\text{Sample wt. in grams}}$$

$T_b$ = ml of acid
N = normality of $H_2SO_4$

Evolved formaldehyde was measured by the following procedure.

A standard melt index assembly is used (Tinnius-Olsen) with temperature control, 200±0.1° C. An orifice was set into the barrel. The time counter was started and 8 grams of the sample was forced down the barrel. A metal drill was set into the orifice to prevent sample from leaking out. A 2000 gm weight was placed onto a piston assembly which was placed in the barrel of the melt indexer. After 3 minutes (total time elapsed) the metal drill and 2000 gm weight were removed. An Erlenmeyer receiver which contains an inlet and outlet port was placed beneath the orifice and a silicone rubber gasket was placed at the interface.

The receiver was connected to three absorption bottles (80, 309 and 30 ml) connected in series. The nitrogen gas rate was adjusted to approximately 400 ml/min. After 4½ minutes a 20 kg weight was placed on the piston. Injection starts after 5 minutes and ends after 7 minutes.

The water obtained from the absorption bottles was analyzed via the chromotropic acid method for formaldehyde analysis. In this method 1 ml of a 11% chromotropic acid solution and 1 ml of the sample were added to 23 ml of concentrated sulfuric acid. The generation of a purple color signifies the presence of formaldehyde and its absorbance was measured at 580 nm. The concentration of the solution was determined with the use of a standard absorbance vs. concentration curve.

Replicate experiments (6X) indicate that a variance of ±10-15% on the evolved formaldehyde values would be expected.

Volatiles were measured by the following procedure.

Ten grams of sample was accurately weighed, dried in a vacuum oven (25" vacuum) at 100° C. for one hour and cooled in a dessicator for thirty minutes. The sample was then reweighed and the moisture level determined by use of the following formula:

$$\% \text{ Moisture} = \left( \frac{\text{Original wt.} - \text{wt. after drying}}{\text{Sample Wt.}} \right) \times 100$$

Table I below sets forth the results found. The ratio values shown in Table I are the ratios (by weight percent) of carrier resin to polyamide. Run Number 1 is for comparison purposes, n carrier resin being used. In Run 1 the Elvamide 8063 was present in the molding composition in an amount of 0.25 percent by weight of the total composition weight. The Irganox 259, Acrawax C and U 10-11 were present in the amounts specified above. Table I also sets forth Kd values, which are a measure of the degradation rate of the molding composition and were obtained by the following procedure.

The apparatus consisted of a forced draft oven containing a cylindrical aluminum block, 4 in. high and 14 in. in diameter, as a heat sink. The block was provided with six recesses, ⅛ in. deep and 2¼ in. in diameter, to accommodate aluminum dishes containing polymer samples. A thermocouple inserted in the block was connected to a recorder-controller system capable of maintaining the block temperature to within ±0.25° C. over the range 200°-270° C.

A guided lid, providing 1 in. of space above the samples when resting on the block, was lifted by a pulley and cable arrangement as the oven door was opened and lowered as the door was closed. A ⅛ in. hole drilled into the top surface of the block and out the side, provided a vent for degradation products to displace the air and escape. Thus, there was limited access of air above the sample; in this respect, the environment to which the polymer was subjected tends toward that prevailing in the barrel of a polymer-processing machine, such as an extruder or injection molding apparatus. In the polymer degradation test the samples were exposed to a constant sweep of air.

A polymer specimen (5 g.) was accurately weighed (to 0.2 mg.) in a disposable aluminum dish, and placed in the block recess. After 45 min., the sample was removed, cooled in a desiccator to room temperature, and weighed. The per cent weight loss, divided by 45 min., gave a $K_{D230}$ value which is the average per cent weight loss per minute at 230° C. The coefficient of variation for values determined by this method was 4-7%.

This apparatus was also used to obtain comparative data between samples subjected to thermal exposure over extended periods of time by simply plotting weight loss suffered versus time at the given temperature. From F. Berardinelli and T. Dolce, *Journal of Polymer Science*, Vol. 9, 1419-1429 (1965).

Table I also sets forth the particle size and structure of the polyamide in various of the carrier resins by examining the polyamide - carrier resin dispersion with a scanning electron microscope prior to admixing the polyamide-carrier resin dispersion with the oxymethylene copolymer.

In Run 1 the polyamide and oxymethylene copolymer were compounded under a nitrogen atmosphere. PEEA 6182 is an ethylene-ethyl acrylate copolymer available from Union Carbide under the trade name Bakelite ® Ethylene Copolymer DPDA - 6182 Natural; PEEA 6169 is an ethylene-ethyl acrylate copolymer available from Union Carbide under the trade name Bakelite ® Ethylene Copolymer DPD - 6169 Natural; PEVA 6479 is an ethylene-vinyl acetate copolymer available from Union Carbide under the trade name Bakelite ® Ethylene Copolymer DQDA-6479 Natural 7; Surlyn is an ethylene copolymer of acrylic or methacrylic acid (or a terpolymer of the acid and acrylate ester) in which partial neutralization with alkali earth or alkali metal is employed and is available from E. I. Du pont de Nemours and Company; PE-Soltex G-60 is high density polyethylene MI=0.25 available from Soltex Corp.; PE/PEEA is a blend of polyethylene and PEEA 6182 in the ratios shown; Acryloid is Acryloid KM 330 which is a two phase acrylic interpolymer comprised of an acrylic rubber and a rigid acrylic (crosslinked) based phase, available from Rohm & Haas.

TABLE I

| | Carrier Polyamide | Ratio | Kd %/Min. | Extractable $CH_2O$ % | Evolved $CH_2O$ ppm | Volatiles % | Black Specks 0–40 | 40–80 | 80–120 | SEM |
|---|---|---|---|---|---|---|---|---|---|---|
| | | | | | | | Minute Intervals | | | |
| 1. | Elvamide 8063 | — | .009 | .030 | 131 | .15 | 1 | 3 | 3 | |
| 2. | PEEA 6182 / Elvamide 8063 | 2:1 | .009 | .038 | 131 | .17 | 1 | 1 | 1 | 1–5 μm Spherical and Ellipsoid |
| 3. | PEEA 6169 / Elvamide 8063 | 2:1 | .011 | .035 | 145 | .19 | 2 | 2 | 2 | 1–9 μm Ellipsoids and Columns |
| 4. | PEVA 6479 / Elvamide 8063 | 2:1 | .019 | .035 | 136 | .21 | 1 | 1 | 1 | 1–20 μm Ellipsoids and Columns |
| 5. | Surlyn / Elvamide 8063 | 2:1 | .013 | .032 | 133 | .24 | 2 | 3 | 2 | 1–2 μm Almost 100% Spherical |
| 6. | PE-Soltex G-60 / Elvamide 8063 | 2:1 | .014 | .030 | | .16 | | | | .5–6.0 μm Spherical |
| 7. | PE/PEEA/ Elvamide 8063 | 2:1:1.5 | .016 | .037 | | .19 | | | | .5–15 μm Spherical and Ellipsoid |
| 8. | PE/PEEA/ Elvamide 8063 | 1:1:1 | .014 | .033 | | .19 | | | | .6–8 μm Spherical and Ellipsoid |
| 9. | PE/PEEA/ Elvamide 8063 | 1:2:1.5 | .016 | .030 | | .16 | | | | Very fine Spherical and Ellipsoid |
| 10. | Acryloid / Elvamide 8063 | 2:1 | .018 | .033 | 113 | .22 | 3+ | 3+ | 3+ | |
| 11. | Acryloid / Elvamide 8063 | 1:1 | .015 | .035 | 131 | .23 | 3+ | 3+ | 3+ | |

Black Speck Propensity
0 - None
1 - <50 specks
2 - 50-200 specks
3 - >200 specks As can be seen from Table I, the polyamide-carrier resin dispersions of the present invention significantly reduced the number of black specks found in the molded objects. Compare, for example, Runs 2, 3 and 4 with Runs 1, 5, 10 and 11. The carrier resins used in Runs 5, 10 and 11 were cross-linked.

EXAMPLE II

Table II sets forth the results obtained by preparing various dispersions (differing the ratio) of Elvamide 8063 (polyamide) in the carrier resin PEEA 6182. Run 1 is for comparison purposes with no carrier resin being present. The same oxymethylene copolymer and stabilizer additives as used in Example I were also used to prepare each oxymethylene copolymer molding composition of Example II, in the same weight percents. The test results were measured and conducted a in Example I.

TABLE II

| | Carrier Polyamide | Ratio | Kd %/Min. | Extractable $CH_2O$ % | Evolved $CH_2O$ ppm | Volatiles % | Black Specks 0–40 | 40–80 | 80–120 |
|---|---|---|---|---|---|---|---|---|---|
| | | | | | | | Minute Intervals | | |
| 1. | Elvamide 8063 | — | .009 | .030 | 131 | .15 | 1 | 3 | 3 |
| 2. | PEEA 6182 / Elvamide 8063 | 4:1 | .011 | .034 | 119 | .20 | 1 | 1 | 2 |
| 3. | PEEA 6182 / Elvamide 8063 | 2:1 | .009 | .038 | 131 | .17 | 1 | 1 | 1 |
| 4. | PEEA 6182 / Elvamide 8063 | 3:2 | .009 | .032 | 119 | .22 | 1 | 1 | 1 |
| 5. | PEEA 6182 / Elvamide 8063 | 1:1 | .010 | .034 | 104 | .20 | 3 | 3 | 3 |
| 6. | PEEA 6182 / Elvamide 8063 | 3:7 | 0.11 | 0.35 | 125 | .19 | 3 | 3 | 3 |

As can be seen from Table II, the amount of polyamide in the carrier resin dispersion should be below about 50 weight percent. While polyamide-carrier resin dispersions having less than about 20 percent by weight polyamide can be used there does not appear to be any practical advantage in so doing. Thus, dispersions containing from about 20 to about 40 weight percent polyamide are preferred.

EXAMPLE III

In Table III below results are shown where various additional materials are used to form the polyamide-carrier resin dispersion. Runs 1 and 2 are for comparison purposes. The oxymethylene copolymer and stabilizer additives were used in the same amounts as in Example I to prepare each oxymethylene copolymer molding composition of Example III, except for Run 3 which used additional Acrawax C (added to the polyamide-carrier resin dispersion) and Run 4 which used Monamide 1089 (added to the polyamide-carrier resin dispersion). Monamide 1089 is lauric diethanol amide available from Mona, Inc. The oxymethylene copolymer of Example III, however, was from a different feed stock than that used in Examples I and II.

In runs 3 and 4 the polyamide-carrier resin dispersion and additive comprised 0.75 weight percent of the total composition, however, the components and weight percents varied a shown in Table III below.

TABLE III

| Carrier Polyamide | Additive | Ratio Carrier Polyamide/ Additive | Kd %/Min. | Extractable CH$_2$O % | Evolved CH$_2$O ppm | Volatiles % | Black Specks 0-40 | 40-80 | 80-120 | SEM |
|---|---|---|---|---|---|---|---|---|---|---|
| | | | | | | | Minute Intervals | | | |
| 1. Elvamide | — | — | .011 | .040 | 168 | .22 | 2 | 3 | 2 | — |
| 2. PEEA 6182 Elvamide 8063 | — | 2/1 | .009 | .039 | 174 | .20 | 1 | 2 | 2 | .3-6.0 μm Well dispersed spheres |
| 3. PEEA 6182 Elvamide 8063 | Acrawax C | 2/1/.05 | .009 | .039 | 151 | .21 | 1 | 1 | 1 | .3-6.0 μm Ellipsoids and Cylinders |
| 4. PEEA 6182 Elvamide 8063 | Monamid 1089 | 2/1/.05 | .010 | .039 | 139 | .18 | 1 | 1 | 2 | .5-15 μm Ellipsoids and Cylinders |

A large scale plant type comparison of an oxymethylene copolymer containing Elvamide 8063 with a copolymer containing the Elvamide 8063 dispersed in PEEA 6182 (2/1 weight ratio of carrier to Elvamide) was conducted. The trials were conducted to compare the processability of the two formulations. After 46 hours of compounding the oxymethylene copolymer with Elvamide an extremely high level of black specks began appearing and the unit was shut down. The compounding of the oxymethylene copolymer with the Elvamide - PEEA 6182 dispersion was conducted for 49 hours without any appreciable onset of black specks. Comparison of the compounding screws showed the presence of charred particles only in the case of Elvamide alone.

This further demonstrates that the use of the polyamide-carrier resin dispersion will allow longer processing, i.e., compounding, before appreciable black speck formation occurs, thereby improving the economics of the compounding sequence and improving the overall quality of the product.

Although the invention has been described with preferred embodiments it is to be understood that variations and modifications may be employed without departing from the concept of the invention as defined in the following claims.

We claim:

1. A stabilized oxymethylene polymer molding composition comprising an intimate blend of:
   (a) a major portion of oxymethylene polymer, and
   (b) a minor portion of a dispersion of polyamide in a carrier resin, the polyamide comprising less than about 50 weight percent of the dispersion and having a melting o softening point below the melting point of the oxymethylene polymer, and the carrier resin being inert to the oxymethylene polymer and having a melting or softening point equal to or below the melting point of the oxymethylene polymer.

2. A molding composition according to claim 1 wherein the polyamide is present in an amount of from about 0.01 to about 10.0 weight percent, based on the weight of oxymethylene polymer.

3. A molding composition according to claim 2 wherein the polyamide comprises from about 20 to about 40 weight percent of the dispersion.

4. A molding composition according to claim 3 wherein the carrier resin is selected from the group consisting of ethylene polymers and co-polymers.

5. A molding composition according to claim 4 wherein the oxymethylene polymer is selected from the group consisting of:

(i) oxymethylene homopolymer,
(ii) oxymethylene copolymer comprising about 85 to about 99.9 percent recurring —OCH$_2$— groups interspersed with groups of the formula:

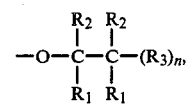

wherein each R$_1$ and R$_2$ is selected from the group consisting of hydrogen, lower alkyl and halogen-substituted lower alkyl radicals, each R$_3$ is selected from the group consisting of methylene, oxymethylene, lower alkyl and haloalkyl-substituted methylene, and lower alkyl and haloalkyl-substituted oxymethylene radicals and n is an integer from 0 to 3, inclusive, each lower alkyl radical having from 1 to 2 carbon atoms, inclusive, said copolymer having a number average molecular weight of at least 10,000 and a melting point of at least 150° C., and (iii) oxymethylene terpolymer, which is the reaction product of trioxane, a cyclic ether and/or cyclic acetal, and a diglycide of the formula:

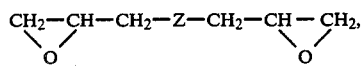

wherein Z is selected from the group consisting of a carbon-to-carbon bond, oxygen, an oxyalkoxy of 1 to 8 carbon atoms, and an oxypoly(lower alkoxy).

6. A stabilized oxymethylene polymer molding composition comprising an intimate blend of:
   (a) a major portion of an oxymethylene copolymer comprising about 98 percent recurring —OCH$_2$— groups and about 2 percent recurring —OCH$_2$CH$_2$— groups, said oxymethylene copolymer having a number average molecular weight of at least 10,000 and a melting point of at least 150° C., and said oxymethylene copolymer being derived from trioxane and ethylene oxide, and (b) a minor portion of a dispersion of polyamide in a carrier resin, the polyamide comprising less than about 50 weight percent of the dispersion and having a melting or softening point below the melting point of the oxymethylene copolymer, and the carrier resin being inert to the oxymethylene copolymer and having a melting or softening point below the melting point of the oxymethylene copolymer.

7. A molding composition according to claim 6 wherein the polyamide is present in an amount of from about 0.01 to about 1.0 weight percent, based on the weight of the oxymethylene copolymer, the polyamide comprises from about 20 to about 40 weight percent of the dispersion, and the carrier resin is selected from the group consisting of ethylene-ethyl acrylate copolymers and ethylene-vinyl acetate copolymers.

8. A process for reducing black speck formation which occurs during the compounding and molding of oxymethylene polymer compositions containing polyamide stabilizers having a melting or softening point below the melting point of the oxymethylene polymer, which comprises adding the polyamide to the oxymethylene polymer as a dispersion of the polyamide in a carrier resin, the polyamide comprising less than about 50 weight percent of the dispersion and the carrier resin being inert to the oxymethylene polymer and having a melting or softening point equal to or below the melting point of the oxymethylene polymer.

* * * * *